United States Patent
Bhargava et al.

(10) Patent No.: US 7,079,938 B2
(45) Date of Patent: Jul. 18, 2006

(54) INFLUENCE OF ENGINE PARAMETERS ON CONDENSATION PROTECTION STRATEGIES

(75) Inventors: Sameer Bhargava, Canton, MI (US); Ravishankar Ramamurthy, Inkster, MI (US); Laurentiu Vaduva, Harper Woods, MI (US)

(73) Assignee: Detroit Diesel Corporation, Detroit, MI (US)

( * ) Notice: Subject to any disclaimer, the term of this patent is extended or adjusted under 35 U.S.C. 154(b) by 301 days.

(21) Appl. No.: 10/627,936

(22) Filed: Jul. 25, 2003

(65) Prior Publication Data

US 2005/0021218 A1 Jan. 27, 2005

(51) Int. Cl.
*F02M 25/07* (2006.01)

(52) U.S. Cl. .................. 701/108; 123/568.21; 73/118.1
(58) Field of Classification Search ................ 701/108, 701/109, 102; 123/299, 305, 568.21, 568.24; 73/116, 118.1; 60/274, 280, 285
See application file for complete search history.

(56) References Cited

U.S. PATENT DOCUMENTS

| | | | |
|---|---|---|---|
| 4,719,894 A | | 1/1988 | Osada |
| 5,577,484 A | | 11/1996 | Izutani et al. |
| 5,738,126 A | * | 4/1998 | Fausten .................. 123/568.21 |
| 5,826,559 A | | 10/1998 | Ichimoto et al. |
| 5,953,905 A | | 9/1999 | Jerger et al. |
| 6,112,518 A | | 9/2000 | Jerger et al. |
| 6,523,340 B1 | * | 2/2003 | Kurihara et al. ........... 73/118.1 |
| 6,619,033 B1 | * | 9/2003 | Adler et al. ................... 60/274 |
| 6,659,071 B1 | * | 12/2003 | LaPointe et al. ............ 123/299 |
| 2003/0192516 A1 | | 10/2003 | Brunemann et al. |

FOREIGN PATENT DOCUMENTS

| | | |
|---|---|---|
| GB | 238470 | 2/1925 |
| WO | 2004/044406 | 5/2004 |

* cited by examiner

*Primary Examiner*—Hieu T. Vo
(74) *Attorney, Agent, or Firm*—Brooks Kushman P.C.

(57) ABSTRACT

A control and method for an internal combustion engine that includes an exhaust gas recirculation system to predict an intake manifold critical temperature (dew point) at which condensation would occur upon entry into exhaust gas recirculation. The control calculates the intake manifold critical temperature (IMT_Critical) as a function of predetermined, sensed or assumed values by processing an equation whose variables are occupied by the values. The control commands adjustments of exhaust gas recirculation operation in response to the calculation, preferably after the actual intake manifold temperature exceeds the IMT_Critical for a predetermined time.

14 Claims, 3 Drawing Sheets

INFLUENCE OF ENGINE PARAMETERS ON CONDENSATION PROTECTION STRATEGIES

BACKGROUND OF THE INVENTION

1. Field of the Invention

The present invention relates to compression ignition internal combustion engines including exhaust gas recirculation and variably operating between an exhaust gas recirculation (EGR) mode and a non-EGR mode, preferably known as boost mode, wherein an engine control monitors operating conditions and calculates a critical intake manifold temperature under operating conditions as a function of a selected set of influence factors to predict condensation, and when operating conditions would result in condensation in the intake manifold during EGR mode, operating the engine in the non-EGR mode.

2. Background Art

Condensation is a problem identified in engines using exhaust gas recirculation (EGR). The hot exhaust gas from diesel engines includes a mixture of water vapor from the burnt fuel and ambient air. EGR engines recirculate a limited amount of exhaust gas back into the intake manifold to combust any unused fuel and byproducts. Due to the lower temperature of the intake air at the intake manifold, condensation may occur in the manifold when exhaust gas is mixed with fresh air in the intake manifold. For a given operating condition (with fixed air/fuel ratio (AFR), the variable degree of recirculation (% EGR) and intake manifold pressure (IMP)) and for a given ambient conditions such as ambient temperature (ATI) and relative humidity (ATIRH), the water vapor will condense at a dew point temperature. The dew point temperature is defined as the intake manifold critical temperature (IMT_) and is influenced by many conditions. The condensate is acidic due to presence of compounds of nitrogen and sulfur from fuel. Moreover, the engine and the equipment in which it may be installed operate in wide ranges of ambient temperatures, for example, −25 deg C. to 50 deg C. and relative humidity 0% to 100%, for highway.

The use and variation of the EGR operation may be controlled if all of influences could be sensed concurrently. However, some of the influential conditions or parameters cannot be readily or economically sensed in the environment of equipment, particularly vehicles, in ambient conditions and modes of operation. For example, if RH cannot be measured, then a fixed relative humidity may be assumed depending on what kind of protection is required. For example, over protection may be desired by assuming a high humidity value, where EGR entry is limited to preserve the engine. Alternatively, under protection may assume a low humidity so that EGR entry is enhanced to reduce emissions, but at the risk of reduced engine life.

SUMMARY OF THE INVENTION

The present invention overcomes the above mentioned disadvantages by devising a new way to calculate IMT_Critical. This method is described with an equation that defines IMT_Critical as a function of a selected set of engine operating parameters although many different engine performance parameters affect IMT_. The invention reduces the number of parameters being processed in the control and reduces the complexity of the processing taking those parameters affecting IMT_. The method also provides an equation to be put in Engine Control Unit (ECU) for an accurate calculation of a prediction for IMT_Critical that may be employed in control algorithms.

In the preferred embodiment, IMT_Critical is defined as a linear function of the specified parameters, to avoid the complex processing and memory requirement of higher order equations. The type and number parameters of the linear function are selected to get the best curve fit ($R^2$). The combination of a reduced number of the parameters are selected to get the best $R^2$ (measurement of the quality of fit), since for example, AFR and EGR % depend directly on air mass (AM) and AM is not measured directly. In addition, some factors exert greater influence upon the dew point than others.

A preferred example of the IMT_Critical equation is $$\text{IMT\_Critical} = x1*V1 + x2*V2 + x3*V3 + x4*V4 + x5*V5 + x6*V1*V1 +$$
$$x7*V2*V2 + x8*V3*V3 + x9*V4*V4 + x10*V5*V5 +$$
$$x11*V1*V2 + x12*V1*V3 + x13*V1*V4 + x14*V1*V5 +$$
$$x19*V3*V5 + x20*V4*V5 + x21$$

Where, x1, x2, ... x21 are constants to be determined, and V1, V2, ... V5 are the engine parameters that are measured.

This equation may be incorporated into the ECU (Electronic Control Unit) to calculate an IMT_Critical prediction. The condensation equation determines IMT_Critical based on the required parameters that may be populated, sensed or assumed values, the combined parameters providing an improved result without undue processing or excessive assumptions unrelated to actual conditions experienced by the equipment. Accordingly, when the measured intake manifold temperature in EGR mode is higher than IMT_Critical, the control may command the engine to operate in recirculation operating mode without harmful condensation at the intake manifold. This method is preferably applied only in steady state/cruising conditions of the vehicle due to the residence time required for condensation to occur.

BRIEF DESCRIPTION OF THE DRAWINGS

The present invention will be more clearly understood by reference of the following detailed description of a preferred embodiment when read in conjunction with the accompanying drawing, in which like reference characters refer to like parts throughout the views, and in which.

DETAILED DESCRIPTION OF THE PREFERRED EMBODIMENT(S)

Figure 1:
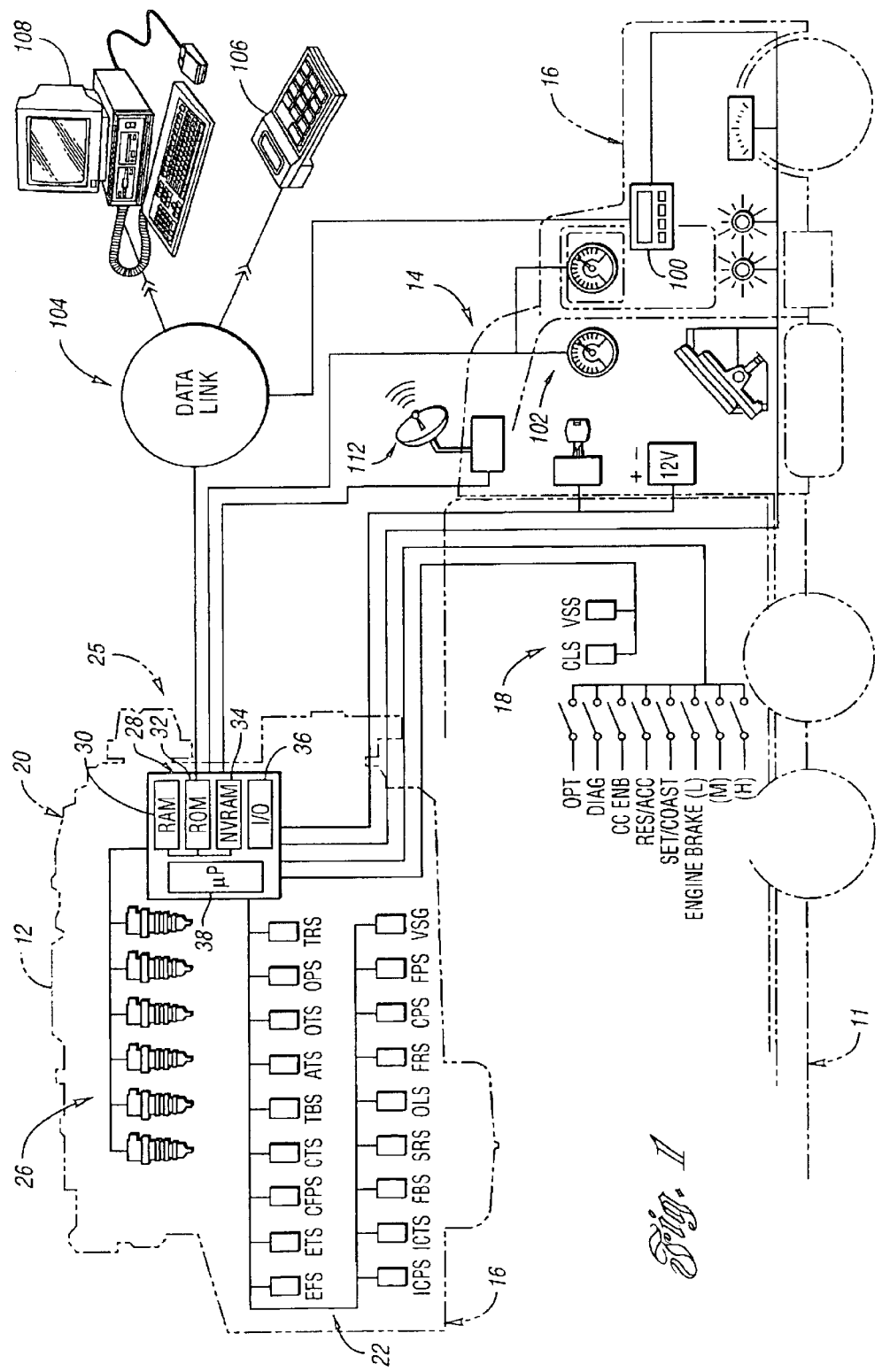
FIG. 1 is a diagrammatic view of equipment which is a vehicle or machinery and includes a perspective view of an engine with an engine control in accordance with the present invention.

FIG. 1 is a perspective view of a compression-ignition, internal combustion engine 20 incorporating various features of engine control according to the present invention. As will be appreciated by those of ordinary skill in the art, engine 20 may be used in a wide variety of equipment 1I for applications including on-highway trucks, construction equipment, marine vessels, and stationary generators, among others. Engine 20 includes a plurality of cylinders disposed below a corresponding cover, indicated generally by reference numeral 12. In a preferred embodiment, engine 20 is a multi-cylinder compression ignition internal combustion engine, such as a 4, 6, 8, 12, 16, or 24 cylinder diesel engine, for example. Moreover, it should be noted that the present invention is not limited to a particular type of engine or fuel.

Engine 20 includes an engine control module (ECM) 28. ECM 28 communicates with various engine sensors and actuators via associated cabling or wires, indicated generally by reference numeral 18, to form a controller 25 (FIG. 2) to control the engine 20 in equipment 11. In addition, controller 26 communicates with the engine operator using associated lights, switches, displays, and the like as illustrated in greater detail in FIG. 2. When mounted in a vehicle, engine 20 is coupled to a transmission via flywheel 16. As is well known by those in the art, many transmissions include a power take-off (PTO) configuration in which an auxiliary shaft may be connected to associated auxiliary equipment which is driven by the engine/transmission at a relatively constant rotational speed using the engine's variable speed governor (VSG). Auxiliary equipment may include hydraulic pumps for construction equipment, water pumps for fire engines, power generators, and any of a number of other rotationally driven accessories. Typically, the PTO mode is used only while the vehicle is stationary. However, the present invention is independent of the particular operation mode of the engine, or whether the vehicle is stationary or moving for those applications in which the engine is used in a vehicle having a PTO mode.

Figure 2:
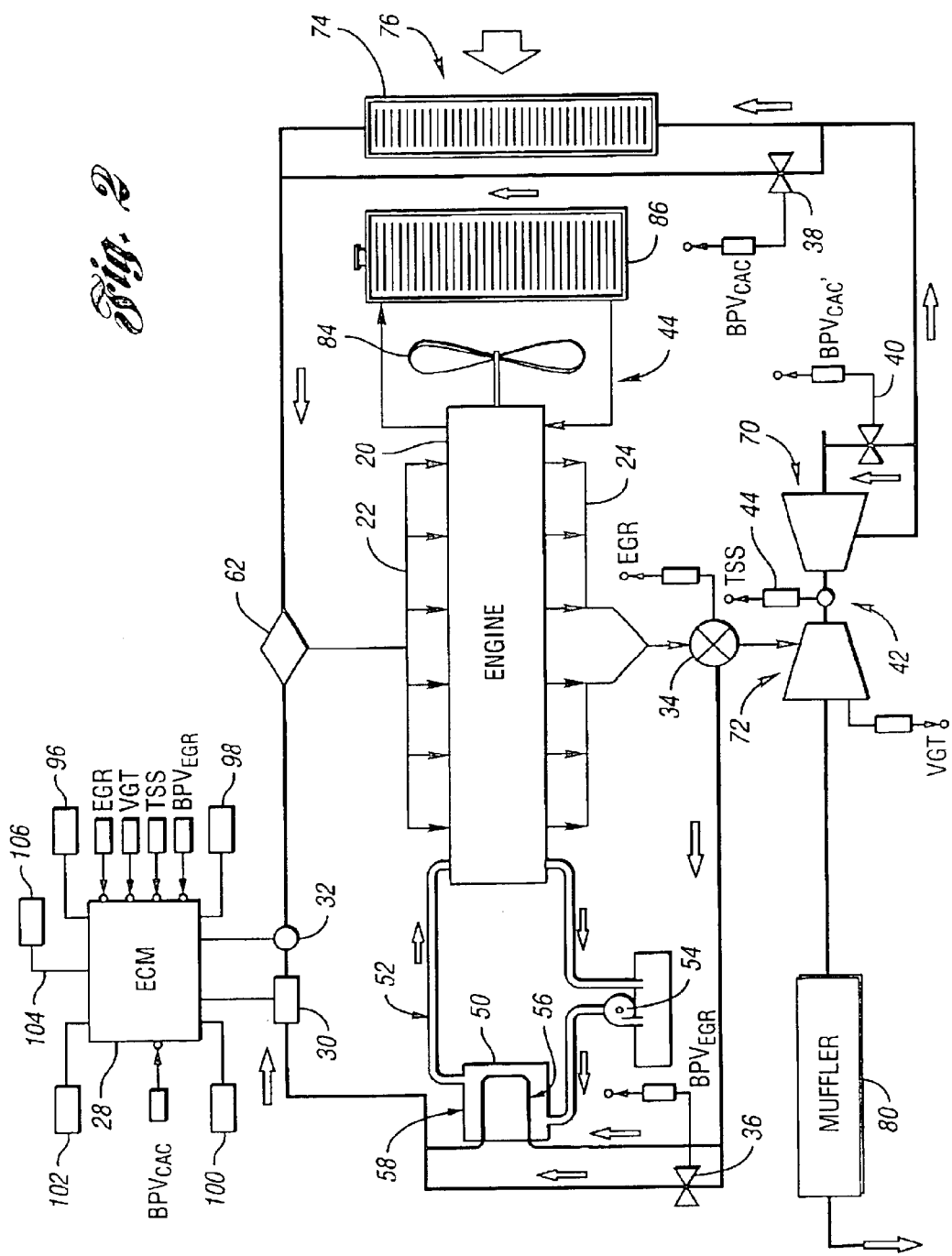
FIG. 2 is a diagrammatic and schematic view of a control system for exhaust gas recirculation control in the engine of FIG. 1.

As better, shown in FIG. 2, ECM 28 of controller 25 may communicate with various vehicle output devices such as status indicators/lights 96, analog displays 97, digital displays 100, and various analog/digital gauges 102. In one embodiment of the present invention, ECM 28 utilizes an industry standard data link 104 to broadcast various status and/or control messages which may include engine speed, accelerator pedal position, vehicle speed, and the like. Preferably, data link 104 conforms to SAE J1939 and SAE J1587 to provide any of the various service, diagnostic, and control information to other engine systems, subsystems, and connected devices such as display 100. Preferably, ECM 28 includes control logic to determine and represents current engine and ambient operating conditions to detect engine operating conditions, such as EGR condensation conditions, and to control the engine accordingly to avoid EGR condensation. As described in greater detail below, ECM 28 preferably monitors engine speed and load, ambient temperature, EGR flow (%) and temperature, turbo boost and/or manifold pressure, and air/fuel ratio to determine a threshold for activation of condensation avoidance strategies, which may include selectively diverting at least a portion of the EGR flow around the EGR cooler to raise the intake manifold temperature and reduce or eliminate condensation of the recirculated exhaust gas. Similarly, at least a portion of the charge air may be selectively diverted around the charge air cooler.

A service tool 106 may be periodically connected via data link 104 to program selected parameters stored in ECM 20 and/or receive diagnostic information from ECM 28. Likewise, a computer may be connected with the appropriate software and hardware via data link 104 to transfer information to ECM 28 and receive various information relative to operation of engine 12, the vehicle 14 and the control methods of the present invention.

Engine 20 includes an intake manifold 22, an exhaust manifold 24, and an exhaust gas recirculation (EGR) system indicated generally by reference numeral 26. An engine control module (ECM) 28 includes stored data representing instructions and calibration information for controlling engine 20. ECM 28 communicates with various sensors and actuators including EGR sensors such as EGR flow sensor 30 and EGR temperature sensor 32. ECM 28 controls EGR system 26 via actuators such as an EGR valve 34, EGR cooler bypass valve 36 ($BPV_{EGR}$), and optionally one or more charge air cooler bypass valves ($BPV_{CAC}$) 38, 40. In addition, ECM 28 preferably controls a variable nozzle or variable geometry turbocharger (VGT) 42 and monitors an associated turbo speed sensor 44 and turbo boost sensor.

EGR system 26 preferably includes an EGR cooler 50, which may be connected to the engine coolant circuit 52. EGR cooler 50 is preferably a full-flow cooler connected in-line with the engine coolant system, although other arrangements and types of EGR coolers may be used without departing from the scope of the present invention. EGR cooler 50 may be directly coupled to a corresponding water or coolant pump 54, or may be placed at a different location in the engine cooling circuit depending upon the particular application. In addition, EGR cooler 50 is preferably a two-pass cooler having a first pass 56 and second pass 58 for the recirculated exhaust gas passing through the core.

The EGR cooler bypass valve ($BPV_{EGR}$) 36 may be selectively operated by ECM 29 to control temperature of the EGR flow by diverting none, some, or all of the flow around EGR cooler 50 based on current ambient and engine operating conditions. Valve 36 may be a solenoid operated on/off valve so that some or all of the EGR flow will bypass EGR cooler 50 under operating and ambient conditions that promote condensation. Although a modulating bypass valve may be useful for some applications, it is not required because modulation of EGR valve 34 may be used to control the overall EGR flow. Similarly, one or more charge air bypass valves ($BPV_{CAC}$) 38, 40 may be provided to selectively raise the charge air temperature and consequently the intake manifold temperature. As illustrated, charge air bypass valve 40 selectively diverts none, some, or all of the charge air around charge air cooler 74. Alternatively, or in combination, bypass valve 40 diverts none, some, or all of the charge air from the outlet of turbocharger compressor 70 to the inlet to raise the inlet air temperature. Preferably, ECM 28 operates valves 36, and/or 38 and/or 40 to control the EGR temperature based on current ambient and operating conditions to reduce or eliminate condensation of the recirculated exhaust gas in the EGR circuit and the intake manifold. As described below, the control strategy may use ambient temperature, relative humidity, intake manifold temperature and pressure, air/fuel ratio, and % EGR to determine when to control EGR valve 34 and one or more bypass valves 36, 38, 40 to reduce or eliminate condensation.

In operation, ECM 28 controls EGR system 26 and VGT 42 based on current ambient and operating conditions and calibration information to mix recirculated exhaust gas with charge air via mixer 62, which is preferably a pipe union. The combined charge air and recirculated exhaust gas is then provided to engine 20 through intake manifold 22. In one preferred embodiment, engine 120 is a 6-cylinder compression-ignition internal combustion engine, although the number of cylinders and combustion type may be varied without departing from the present invention. ECM 28 includes control logic to monitor current ambient operating conditions, such as temperature and optionally, humidity, and engine control parameters and operating conditions to control EGR system 26. During operation of engine 20, intake air passes through compressor portion 70 of VGT 42 which is powered by turbine portion 72 via hot exhaust gasses. Compressed air travels through charge air cooler 74 which is preferably an air-to-air cooler cooled by ram air 76. Charge air passes through cooler 74 to mixer 62, which is preferably a pipe union, where it is combined with recirculated exhaust gas based on current engine operating conditions. Exhaust gas exiting engine 20 through exhaust manifold 24 passes through EGR valve 34 where a portion of the exhaust gas may be selectively diverted through EGR cooler 50. Bypass valve 36 is selectively operated to divert a portion (none, some, or all) of the diverted exhaust gas around cooler 50 to adjust the temperature of the recirculated exhaust gas. The EGR gases flow past EGR flow sensor 30 and temperature sensor 32 to mixing valve 62 where they are combined with compressed charge air. The remaining exhaust gasses not diverted by EGR valve 34 pass through turbine portion 72 of VGT 42 and muffler 80 before being exhausted to atmosphere. EGR cooler 50 cools the heated exhaust gas using engine coolant circuit 44. Engine coolant is in turn cooled via a cooling fan 84 and radiator 86.

As described above, one or more bypass valves may be added to the intake side of engine 20 upstream of charge air cooler (CAC) 74 to selectively divert some, all, or none of the charge air from compressor portion 70 of VGT 42. The charge air cooler (CAC) bypass valve(s) are selectively operated similar to EGR bypass valve 36 under ambient and operating conditions which may promote condensation within the intake manifold as described and illustrated. This strategy may be based on a measured, estimated, or calculated temperature for the charge air or the combined charge after mixing with EGR flow at mixer 62 in accordance with the present invention.

Figure 3:
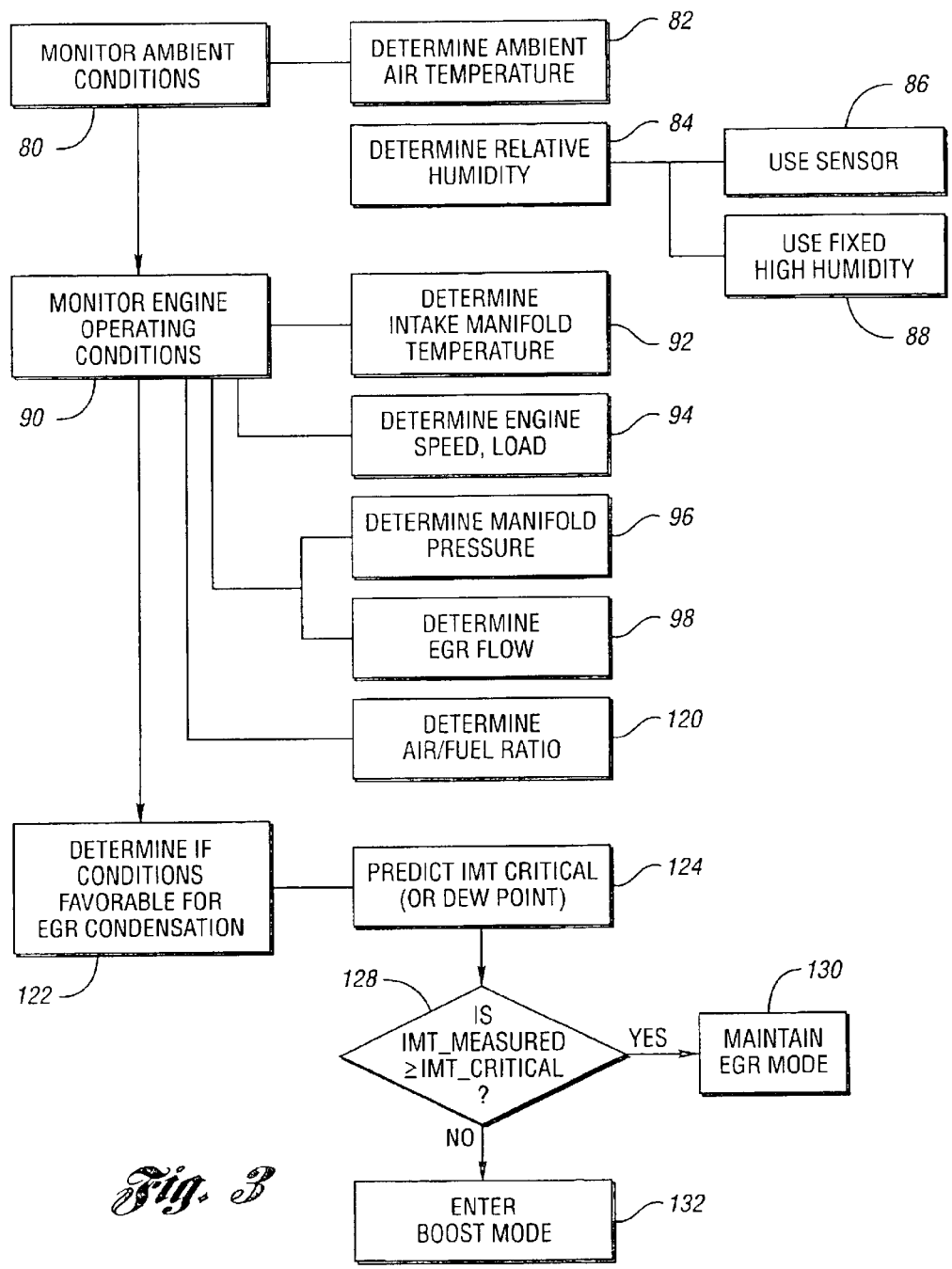
FIG. 3 is a block diagram of an engine control method analysis for sensing dew point at the manifold with the control system according to the present invention.

A block diagram illustrating operation of one embodiment for a system or method for controlling an engine to avoid EGR condensation according to the present invention is shown in FIG. 3: As will be appreciated by one of ordinary skill in the art, the block diagram of FIG. 3 represents control logic which may be implemented or effected in hardware, software, or a combination of hardware and software. The various functions are preferably effected by a programmed microprocessor, such as included in the DDEC controller manufactured by Detroit Diesel Corporation, Detroit, Mich. Of course, control of the engine/vehicle may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated. For example, interrupt or event driven processing is typically employed in real-time control applications, such as control of an engine or vehicle rather than a purely sequential strategy as illustrated. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In various embodiments of the present invention, the control logic illustrated is implemented primarily in software and is stored in computer readable storage media within the ECM. As one of ordinary skill in the art will appreciate, various control parameters, instructions, and calibration information stored within the ECM may be selectively modified by the vehicle owner/operator while other information is restricted to authorized service or factory personnel. The computer readable storage media may also be used to store engine/vehicle operating information for vehicle owners/operators and diagnostic information for maintenance/service personnel. Although not explicitly illustrated, various steps or functions may be repeatedly performed depending on the type of processing employed.

In the representative embodiment of the present invention illustrated in FIG. 3, current ambient conditions are determined or monitored as represented by block 80. Ambient conditions may be determined using appropriate sensors or estimated, inferred or assumed depending upon the particular application. Preferably, block 81 includes at least a determination of the ambient air temperature as represented by block 82. At least one of five operating conditions, preferably, from the group consisting of ambient temperature, intake manifold temperature, EGR mass rate, engine speed and intake manifold, will be sensed, although other operating conditions may also be monitored.

The relative humidity may also be determined as represented by block 85 using a sensor as represented by block 89 or set to a predetermined value as represented by block 87. For example, rather than requiring a humidity sensor, the present invention may use a fixed high value for the relative humidity, such as 100%, which represents a very conservative calibration. This provides the greatest protection or margin of error for operating without formation of EGR condensation in the intake manifold. Of course, lower stored humidity values may be used in determining whether to bypass the EGR cooler and/or charge air cooler, although lower values are more likely to result in some condensation under certain ambient and operating conditions.

Current engine operating conditions are monitored or determined as represented by block 90. This may include sensing of the intake manifold temperature 92, engine speed and load 94, intake manifold pressure 96, and EGR flow (%) 98. Alternatively, the air/fuel ratio or boost may be otherwise determined, but the combined inputs of intake manifold pressure (IMP) and EGR flow (%) provide an expedient substitute for those parameters. The EGR flow 98 and air/fuel ratio 120 may be determined based on scheduled values or based on actual sensed values depending upon the particular application. The current ambient and operating conditions determined in blocks 81 and 90, respectively, are then used to determine whether conditions are favorable for EGR condensation in the intake manifold as represented by block 122.

Of course, predicted IMT_Critical can be very accurately calculated based upon the numerous parameters having an influence upon the temperature. As shown in the diagram of FIG. 3, ambient temperature, relative humidity, air/fuel ratio, EGR percentage and intake manifold pressure have been demonstrated to have a significant effect upon the intake manifold temperature upon entry into the exhaust gas recirculation mode. If for example, relative humidity cannot be measured, then a fixed relative humidity can be assumed depending on whether over protection or under protection is required. Since AFR and EGR percentage depend directly on air mass (AM), and AM is not measured directly, another way may devised to calculate IMT_Critical.

By empirical laboratory testing, the invention has reduced the number of parameters required to provide a reasonably accurate indication of IMT_Critical. For example, engine operating parameters such as fuel mass, fuel temperature and EGR outlet temperature have been empirically determined to have little effect upon the predicted IMT_Critical along with other input/output parameters such as turbine temperatures out or exhaust temperatures. Other parameters that may be easily measured may also be relied upon to produce a reasonably accurate prediction. As a result, as shown at FIG. 3, ambient temperature, intake manifold temperature, EGR _mass_rate, engine speed and intake manifold pressure provide a preferred set of parameters that an equation may be limited to in order to provide useful adjustments in exhaust gas recirculation operation and control.

Preferably, IMT_Critical is defined as a linear function of the specified parameters and the parameters of the linear function are optimized by statistical tool/software to get the best curve fit. A combination of the parameters is designed to get the best measurement of the quality of fit ($R^2$) by the statistical tool/software.

The preferred IMT_Critical equation is $$IMT\_Critical = x1*V1 + x2*V2 + x3*V3 + x4*V4 + x5*V5 + x6*V1*V1 +$$
$$x7*V2*V2 + x8*V3*V3 + x9*V4*V4 + x10*V5*V5 +$$
$$x11*V1*V2 + x12*V1*V3 + x13*V1*V4 + x14*V1*V5 +$$
$$x19*V3*V5 + x20*V4*V5 + x21$$

Where, x1, x2 ... x21 are constants to be determined, and V1, V2, ... V5 are the engine parameters that are measured.

This equation may be incorporated into the ECU (Electronic Control Unit) to simplify the ways to calculate a predicted IMT_ and the method for controlling an engine or EGR control.

In one embodiment, a dew point (IMT_Critical) of the combined EGR and charge air mixture is determined as shown at 124. The engine control then determines if IMT_Critical predicted is higher than IMT measured in the manifold through the sensor to command a change in exhaust gas recirculation, for example, an exhaust gas bypass by a cooler whose operation would otherwise enhance conditions provoking condensation. Preferably, controlling the engine also includes at least one of modifying charge air flow and modifying EGR flow. Other methods for increasing the intake manifold temperature may also be used in accordance with the present invention. Preferably, the change of mode is deferred until expiration of a stabilization time during which the conditions in the manifold are maintained. This condensation check is usually carried over only in steady/cruising state due to the residence time required for the occurrence of condensation under favorable inducing conditions.

The combination of values obtained by sensing and assumptions are then employed in the processing of data in the control 26 through algorithms after the IMT_Critical equation determines an IMT_Critical value. As shown at 126, the intake manifold temperature is compared with the IMT_Critical prediction. If the IMT measured is greater than the intake manifold temperature critical as predicted by calculation, the control commands turn on the exhaust gas recirculation as shown at 130. If not, the engine may be maintained in boost mode as shown at 132. Other operational changes may be generated by the control 28 in response to the comparison.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling a compression ignition internal combustion engine in a vehicle with an exhaust gas recirculation operating mode comprising:
   at least one sensor for determining at least one of a plurality of parameters taken from the group of operating conditions consisting of ambient temperature, intake manifold temperature, EGR mass rate, engine speed and intake manifold pressure to form a first set of values;
   an occupier determining a combination of values including said first set of values;
   a processor for calculating intake manifold critical temperature as a function of said combination of values; and
   a controller for switching exhaust gas recirculation mode operation when said calculated critical temperature exceeds a predetermined intake manifold critical temperature at which condensation occurs in said intake manifold.

2. A computer readable storage medium having data stored therein representing instructions executable by a computer to control a compression ignition internal combustion engine installed in a vehicle to perform adjustment in an exhaust gas recirculation operation, the computer readable storage medium comprising:
   instructions for establishing a combination of parameter values for a set of engine operating conditions;
   instructions for calculating an intake manifold temperature prediction in response to said establishing by occupying variables of an equation with said combination of parameter values;
   instructions for comparing said intake manifold temperature prediction with an intake manifold temperature indication; and
   instructions for selecting a command in response to said comparing that adjusts exhaust gas recirculation operation of the engine in response to said comparing.

3. The invention as described in claim 2 wherein said instructions for establishing including instructions for quantifying a sensed operating condition of said engine.

4. The invention as described in claim 3 wherein said sensed operating condition is taken from the group consisting of ambient temperature, intake manifold temperature, EGR mass rate, engine speed and intake manifold pressure.

5. The invention as described in claim 2 wherein said response to said comparing is dependent upon said intake manifold temperature being greater than said intake manifold temperature prediction.

6. The invention as described in claim 2 wherein said adjusting is switching on exhaust gas recirculation when said intake manifold temperature is greater than said intake manifold temperature prediction.

7. A method for controlling exhaust gas recirculation of an internal combustion engine comprising:
   determining a steady state condition at which an intake manifold temperature is below an intake manifold critical temperature at which condensation could occur in said intake manifold;
   sensing at least one of a plurality of parameters taken from the group of operating conditions consisting of ambient temperature, intake manifold temperature, EGR mass rate, engine speed and intake manifold pressure to form a first set of values including each said at least one parameter;

determining at least one parameter value for a second set of values for said operating conditions taken from said group;

processing an equation wherein IMT_ is predicted as a function of said group of operating condition variables by occupying variables with said first and second sets of values; and selecting a command in response to said processing.

8. The invention as described in claim 7 wherein said determining comprises assuming a fixed value for said parameter value.

9. The invention as described in claim 7 wherein said sensing comprises sensing each of said group of operating conditions to form a combination of preferred variables defining critical intake manifold pressure as a linear function of said preferred variables.

10. The invention as described in claim 7 wherein said determining comprises assigning a value from a memory or storage of data.

11. The invention as described in claim 10 wherein said assigning comprises reading a look-up table.

12. The invention as described in claim 7 wherein said selecting comprises switching said engine into exhaust gas recirculation mode.

13. The invention as described in claim 7 wherein said selecting comprises bypassing a cooler with exhaust gas recirculated to an intake manifold.

14. The invention as described in claim 7 wherein said processing comprises calculating critical intake manifold pressure in a linear equation.

* * * * *

UNITED STATES PATENT AND TRADEMARK OFFICE
CERTIFICATE OF CORRECTION

| | | |
|---|---|---|
| PATENT NO. | : 7,079,938 B2 | Page 1 of 1 |
| APPLICATION NO. | : 10/627936 | |
| DATED | : July 18, 2006 | |
| INVENTOR(S) | : Sameer Bhargava et al. | |

It is certified that error appears in the above-identified patent and that said Letters Patent is hereby corrected as shown below:

Column 9, Line 8, Claim 7:

Delete "IMT_" and insert therefor -- IMT_Critical --.

Signed and Sealed this

Seventeenth Day of October, 2006

JON W. DUDAS
*Director of the United States Patent and Trademark Office*